(12) United States Patent
Johnson et al.

(10) Patent No.: US 10,176,840 B1
(45) Date of Patent: Jan. 8, 2019

(54) DATA STORAGE DEVICE ADJUSTING SPINDLE MOTOR CURRENT BASED ON CONTINUOUS FUNCTION OF VOICE COIL CURRENT DURING SEEK

(71) Applicant: Western Digital Technologies, Inc., San Jose, CA (US)

(72) Inventors: Brian A. Johnson, Laguna Hilla, CA (US); Jaesoo Byoun, Irvine, CA (US); Hideaki Ito, Fujisawa (JP); Gaku Ikedo, Kanagawa (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/021,938

(22) Filed: Jun. 28, 2018

(51) Int. Cl.
*G11B 19/20* (2006.01)
*G11B 19/02* (2006.01)
*G11B 5/55* (2006.01)

(52) U.S. Cl.
CPC ............ *G11B 19/02* (2013.01); *G11B 5/5547* (2013.01)

(58) Field of Classification Search
CPC ........... G11B 15/46; G11B 19/02; G11B 5/55; G11B 5/52; G11B 5/5582; G11B 19/2054; G11B 19/2063; G11B 19/2072; G11B 19/28; G11B 19/00
USPC ............. 360/73.03, 78.04, 69, 77.06, 68, 70
See application file for complete search history.

(56) References Cited

U.S. PATENT DOCUMENTS

| | | |
|---|---|---|
| 5,157,560 A | 10/1992 | Kanda et al. |
| 5,381,279 A | 1/1995 | Dunn |
| 5,982,570 A * | 11/1999 | Koizumi .................. G06F 1/32 360/31 |
| 6,282,046 B1 | 8/2001 | Houston et al. |
| 6,741,414 B1 | 5/2004 | Boyd et al. |
| 6,876,508 B1 | 4/2005 | Patton, III et al. |
| 7,006,320 B1 | 2/2006 | Bennett et al. |
| 7,309,967 B2 | 12/2007 | Moser et al. |
| 8,049,985 B2 | 11/2011 | Zhu et al. |
| 9,424,868 B1 | 8/2016 | Nicholls et al. |
| 2013/0290611 A1 | 10/2013 | Biederman et al. |

* cited by examiner

*Primary Examiner* — Nabil Z Hindi

(57) ABSTRACT

A data storage device is disclosed comprising a spindle motor configured to rotate a disk, and a first voice coil motor (VCM) configured to actuate a head over the disk. During at least fifty percent of a seek of the head over the disk, a spindle control signal is generated based on a continuous function of a current flowing through the first VCM, and the spindle control signal is applied to the spindle motor.

24 Claims, 6 Drawing Sheets

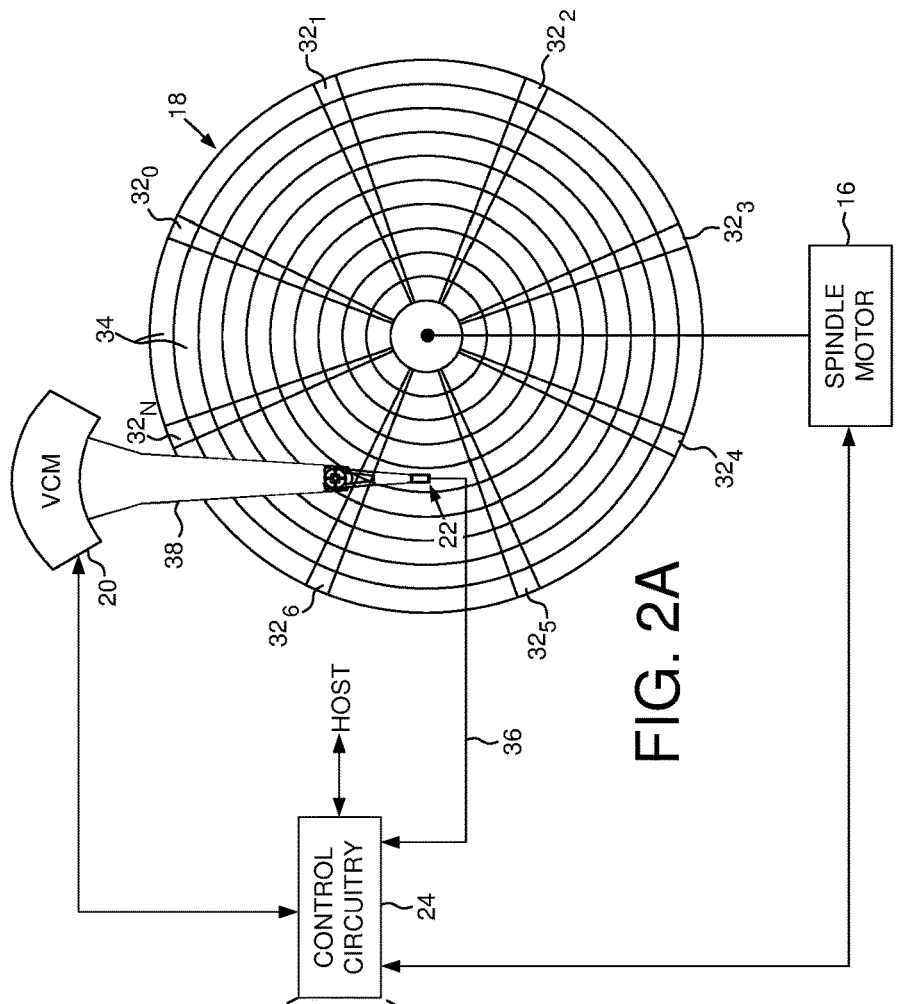
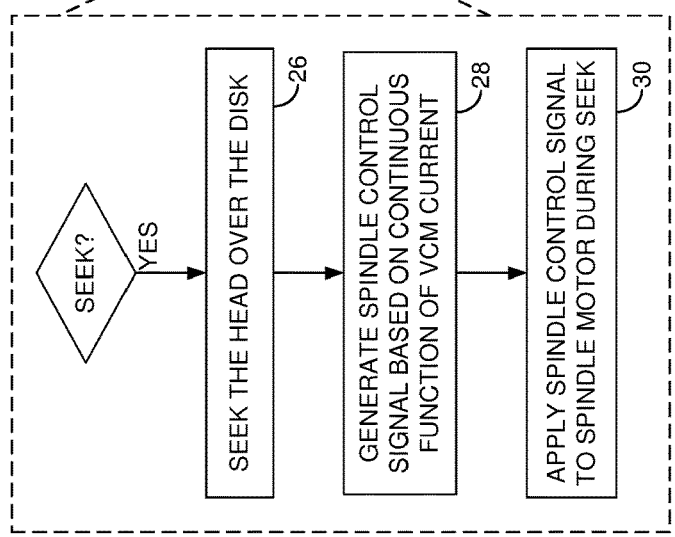

DATA STORAGE DEVICE ADJUSTING SPINDLE MOTOR CURRENT BASED ON CONTINUOUS FUNCTION OF VOICE COIL CURRENT DURING SEEK

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

BRIEF DESCRIPTION OF THE DRAWINGS

FIG. 2A shows a data storage device in the form of a disk drive according to an embodiment comprising a voice coil motor (VCM) configured to actuate a head over a disk, and a spindle motor configured to rotate the disk.

FIG. 2B is a flow diagram according to an embodiment wherein when seeking the head over the disk, a spindle control signal is generated based on a continuous function of a current flowing through the VCM.

DETAILED DESCRIPTION

Figure 1:
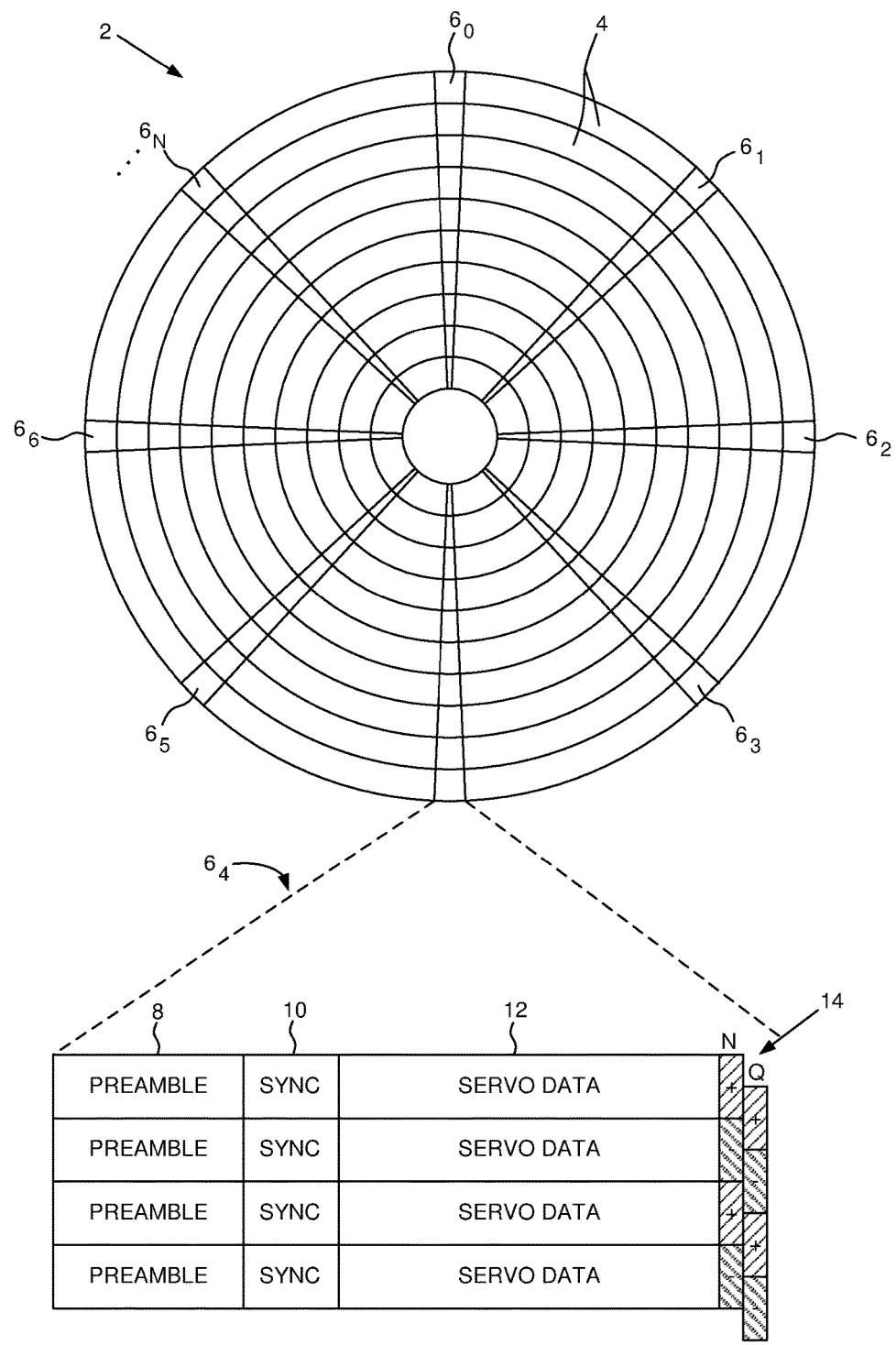
FIG. 1 shows a prior art disk format comprising a plurality of servo tracks defined by servo sectors.

FIG. 2A shows a data storage device in the form of a disk drive according to an embodiment comprising a spindle motor 16 configured to rotate a disk 18, and a voice coil motor (VCM) 20 configured to actuate a head 22 over the disk 18. The disk drive further comprises control circuitry 24 configured to execute the flow diagram of FIG. 2B, wherein when a seek operation is executed to seek the head over the disk (block 26), during at least fifty percent of the seek a spindle control signal is generated based on a continuous function of a current flowing through the VCM (block 28), and the spindle control signal is applied to the spindle motor during the at least fifty percent of the seek (block 30).

In the embodiment of FIG. 2A, the disk 18 comprises a plurality of servo sectors $32_0$-$32_N$ that define a plurality of servo tracks 34, wherein data tracks are defined relative to the servo tracks at the same or different radial density. The control circuitry 24 processes a read signal 36 emanating from the head 22 to demodulate the servo sectors and generate a position error signal (PES) representing an error between the actual position of the head and a target position relative to a target track. A servo control system in the control circuitry 24 filters the PES using a suitable compensation filter to generate a control signal applied to the VCM 20 which rotates an actuator arm 38 about a pivot in order to actuate the head radially over the disk in a direction that reduces the PES. The servo sectors $32_0$-$32_N$ may comprise any suitable head position information, such as a track address for coarse positioning and servo bursts for fine positioning. The servo bursts may comprise any suitable pattern, such as an amplitude based servo pattern or a phase based servo pattern (FIG. 1).

Figure 3:
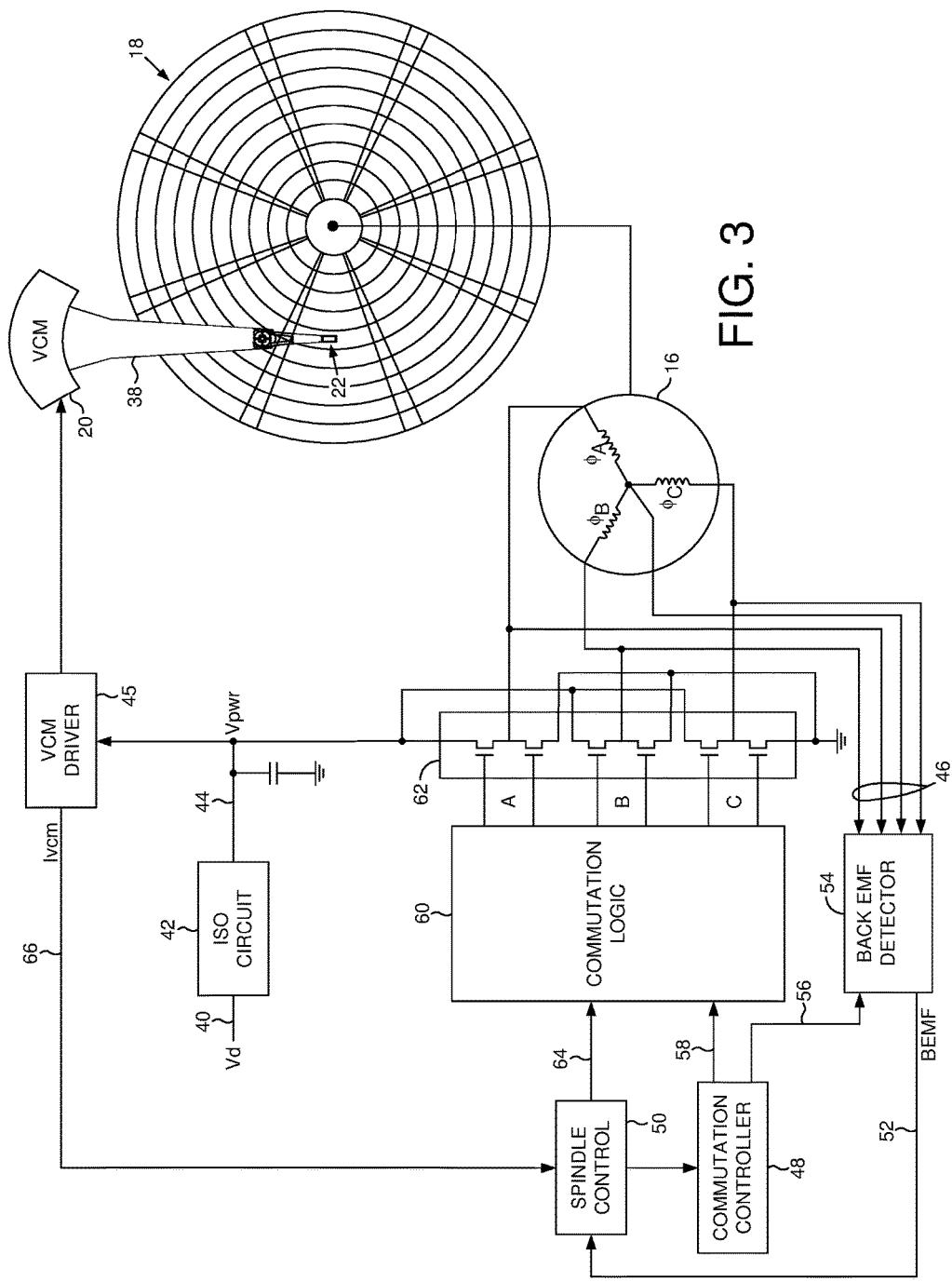
FIG. 3 shows control circuitry configured to commutate the windings of the spindle motor based on the continuous function of the current flowing through the VCM during a seek according to an embodiment.

FIG. 3 shows control circuitry 24 according to an embodiment wherein the disk drive receives a supply voltage 40 from a host which passes through an isolation circuit 42 to become a power voltage Vpwr 44 used to power the disk drive, including to power a VCM driver 45 for controlling the VCM 20 that actuates the head 22 over the disk 18. The power voltage Vpwr 44 also powers spindle control circuitry configured to commutate the spindle motor 16 in order to rotate the disk 18. A back electromotive force (BEMF) voltage 46 generated by the windings of the spindle motor 16 may be processed in order to drive the commutation sequence of a commutation controller 48. A spindle control block 50 may process a BEMF signal 52 which may be a square wave representing the BEMF zero-crossings as detected by a BEMF detector 54. The commutation controller 48 may generate a control signal 56 which configures the BEMF detector 54 to detect the zero-crossing of the BEMF voltage 46 generated by each winding as the disk rotates. The commutation controller 48 also generates a control signal 58 applied to commutation logic 60. In the embodiment of FIG. 3, the commutation logic 60 is configured by the control signal 58 to control the state of switches 62 in order to drive the windings with voltage Vpwr 40. The commutation logic 60 may operate in any suitable manner, such as by driving the switches 62 as linear amplifiers that apply continuous-time sinusoidal voltages to the windings. In another embodiment, the commutation logic 60 may drive the switches 62 using pulse width modulation (PWM), such as using square wave PWM, trapezoidal PWM, or sinusoidal PWM. Regardless as to how the windings are driven, the commutation controller 48 generates the control signal 58 so that the windings are commutated at the correct periods, thereby generating the desired rotating magnetic field that causes the spindle motor to rotate. In one embodiment, the spindle control block 50 may generate a spindle control signal 64 that controls the effective amplitude of the periodic driving voltage applied to the windings (continuous or PWM), thereby controlling the speed of the spindle motor 16.

In one embodiment, the host specifications may limit the amount of current the disk drive is allowed to draw from the host supply voltage 40. For example, there may be a limit on the peak current and/or average current drawn from the host supply voltage 40, wherein if these limitations are exceeded, it may lead to a malfunction of the host or other peripheral devices connected to the host. If the spindle control circuitry maintains the rotation speed of the disk substantially constant (maintains the spindle control signal 64 substantially constant), a conservative seek profile is typically employed to seek the head 22 over the disk 18 in order to ensure the combined spindle motor and VCM current does not exceed the limitations of the host supply voltage 40. However, using conservative seek profiles typically results in longer seek times and a corresponding decrease in the disk drive throughput. Accordingly, in one embodiment when seeking the head 22 over the disk 18 the spindle control circuitry adjusts the spindle control signal 64 (and speed of the spindle motor) based on a function of the current 66 flowing through the VCM 20 during at least fifty percent of the seek. In one embodiment, the VCM current 66 may be detected using a suitable current sensor (e.g., a sense resistor) during the seek, and in another embodiment, the VCM current 66 may be estimated over the seek, for example, based on the known seek profile and design specifications of the VCM 20. In one embodiment, a number of seek profiles may be calibrated each corresponding to a given seek length (e.g., number of servo tracks), and a corresponding VCM current profile generated for each seek profile.

Figure 4A:
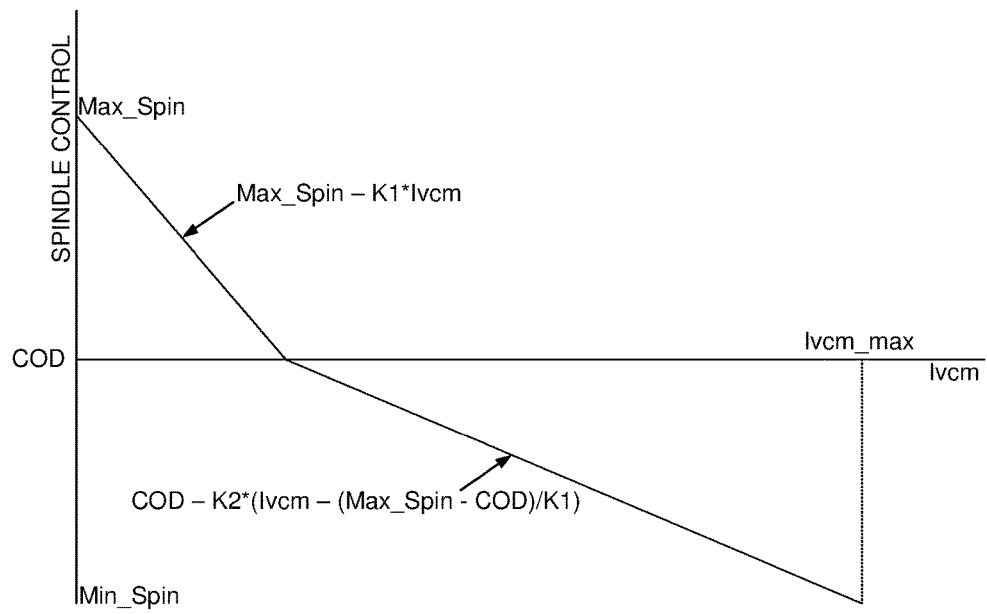
FIG. 4A shows an embodiment wherein the continuous function of the current flowing through the VCM comprises a first linear function up until the spindle control signal causes the spindle motor to source current to the VCM, and a second linear function after the spindle control signal causes the spindle motor to source current to the VCM.

In one embodiment, the spindle control signal 64 is generated during at least fifty percent of a seek based on a continuous function of the VCM current 66. That is, during at least fifty percent of the seek the spindle control signal 64 is adjusted (continuously or periodically) based on a continuous function of the VCM current 66. In one embodiment, the spindle control signal 64 may be adjusted periodically based on the VCM current 66 each time the control circuitry processes a servo sector during the seek. FIG. 4A shows an embodiment wherein the spindle control signal 64 may be generated based on two linear functions of the VCM current 66. When the spindle control signal 64 applied to the spindle motor causes current to flow into the spindle motor, the linear function comprises:

$$\text{Max\_Spin} - K1 * I_{vcm}$$

where Max_Spin represents a maximum for the spindle control signal, Ivcm represents the current flowing through the VCM, and K1 represents a predetermined gain. When the spindle control signal 64 applied to the spindle motor causes the spindle motor to source current to the VCM, the linear function comprises:

$$\text{COD} - K2 * (I_{vcm} - (\text{Max\_Spin} - \text{COD}))/K1$$

where COD (change of direction) represents a threshold for the spindle control signal 64 wherein the spindle motor begins sourcing current to the first VCM and K2 represents a predetermined gain. In one embodiment, the gain K1 is greater than the gain K2 so that the current load balancing favors the VCM until the spindle control signal reaches the COD threshold.

In one embodiment, when accelerating or decelerating the head during a seek the VCM current 66 is high and the corresponding spindle control signal 64 is low so that the spindle motor 16 sources current to the VCM 20. During the constant velocity (or coast phase) of the seek, the VCM current 66 is lower and the corresponding spindle control signal 64 is higher so as to accelerate the spindle motor and thereby compensate for the speed lost while sourcing current to the VCM 20. Any suitable technique may be employed to determine the COD parameter in the above equation, such as by estimating the COD threshold based on known spindle motor parameters (Kt, RPM, temperature, voltage, etc.) or by calibrating the value by adjusting the spindle control signal 64 and measuring the resulting spindle motor current (e.g., over different RPM, temperatures, etc.).

Any suitable values may be selected for the gains K1 and K2 in order to achieve any suitable balance of current load between the spindle motor 16 and VCM 20 during at least fifty percent of a seek. More aggressive seek profiles may be employed for larger gains; however, larger gains also induce larger transients in the rotation speed of the disk. In one embodiment, the control circuitry 24 may calibrate the gains K1 and K2 to achieve aggressive seek profiles while still enabling the spindle control circuitry to regulate the spindle speed at a target value (within a jitter tolerance) so as to enable a subsequent access operation at the end of the seek (write/read operation). In one embodiment, the gains K1 and K2 may be calibrated for different seek lengths and corresponding lengths of the coast phase of the seek. For example, higher values for the gains K1 and K2 may be employed for longer seeks since there is more time to accelerate the spindle motor during the coast phase of the seek.

In yet another embodiment, different gain values for K1 and K2 may be employed during the acceleration phase and deceleration phase of a seek. For example, in one embodiment during the deceleration phase additional braking current may be required to overcome the BEMF voltage generated by the VCM. Accordingly, in one embodiment one or both of the gains K1 and K2 may be increased in order to source more current from the spindle motor during the deceleration phase of a seek.

Figure 4B:
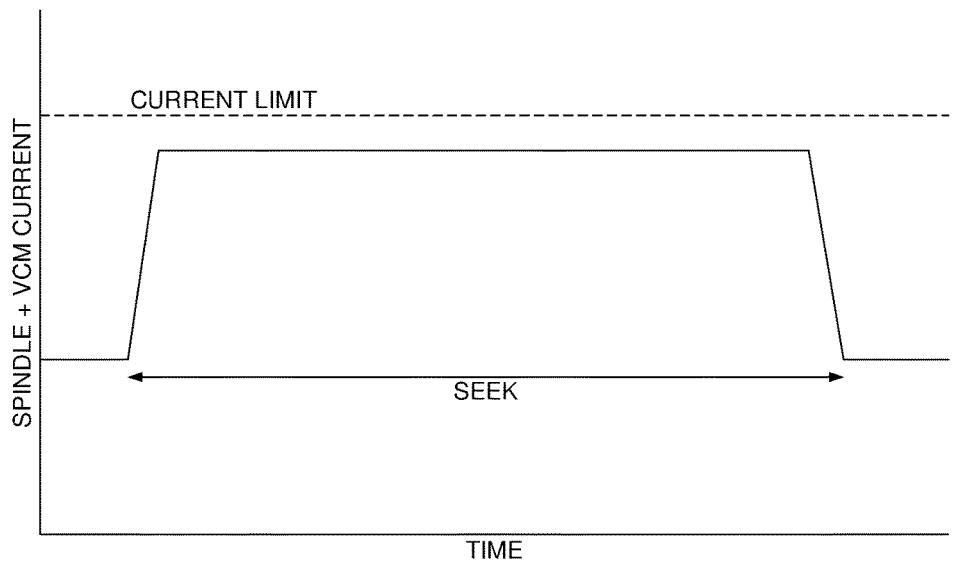
FIG. 4B shows an embodiment wherein the spindle control signal may be generated based on the current flowing through the VCM so as to achieve a substantially constant combined current of the spindle motor current and the VCM current during at least fifty percent of a seek.

In one embodiment, the spindle control signal may be generated based on the current flowing through the VCM so as to achieve a substantially constant combined current for the spindle motor and the VCM during at least fifty percent of the seek. An example of this embodiment is illustrated in FIG. 4B, wherein when a seek is initiated, the combined spindle and VCM current is increased toward a current limit without exceeding the current limit. During at least fifty percent of the seek, the spindle control signal is generated based on the VCM current so that the combined current substantially remains at the elevated level (with some amount of jitter not shown) so as to enable an aggressive seek profile. For sufficiently long seeks, the target level for the combined current may be reduced during at least part of the coast phase of the seek, for example, after the spindle motor accelerates to a maximum speed. In another embodiment, the target level for the combined current may be reduced during at least part of the coast phase and then increased at a predetermined interval before the deceleration phase. That is, the target level for the combined current may be increased before the deceleration phase in order to increase the speed of the spindle motor and resulting kinetic energy so that the spindle motor may then source current to the VCM during the deceleration phase. In one embodiment, the VCM seek profile may be calibrated relative to the amount of current that can be sourced from the spindle motor during the deceleration phase so as to achieve a target spindle speed (access speed) at the end of the deceleration phase.

Although in the above embodiments, the function for generating the spindle control signal based on the VCM current comprises a linear function, any suitable function may be employed, such as any suitable polynomial. For example, in one embodiment the spindle control signal may adjust the amplitude of a driving voltage applied to the windings of the spindle motor, wherein the function for generating the spindle control signal based on the VCM current may be a non-linear function that compensates for the relationship between the driving voltage and the resulting spindle motor current.

Figure 5A:
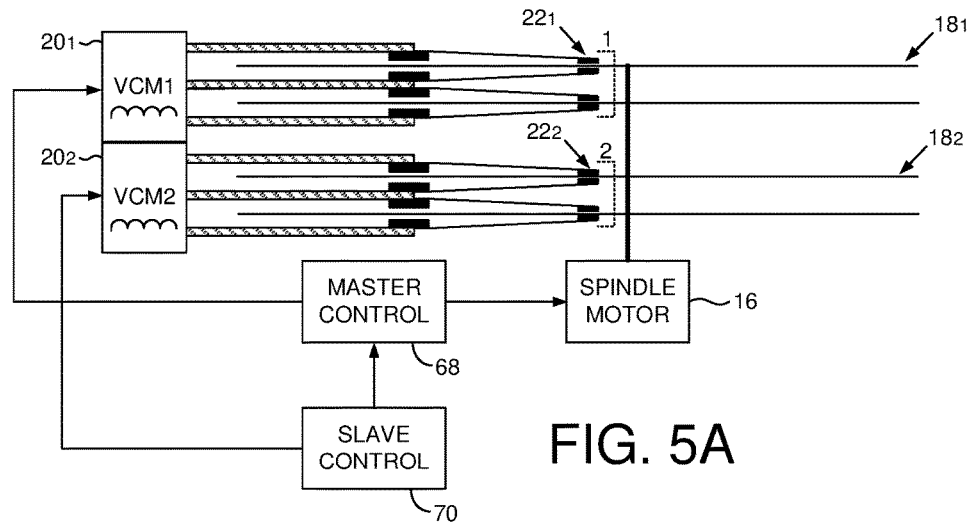
FIG. 5A shows an embodiment wherein first and second VCMs actuate respective heads over respective disks, and the spindle control signal is generated based on the combined current flowing through the VCMs when concurrently seeking the VCMs.

FIG. 5A shows an embodiment wherein the disk drive comprises a first VCM $20_1$ configured to rotate respective heads over respective disks, and a second VCM $20_2$ configured to rotate respective heads over respective disks. In the embodiment of FIG. 5A, the VCMs are rotated about a common pivot in a configuration referred to as a "split actuator" design. In another embodiment, each VCM may be rotated about respective pivots, for example, mounted at different peripheral locations about the disks. The control circuitry in this embodiment comprises a master control circuit 68 configured to control the spindle motor 16 and the first VCM $20_1$ and a slave control circuit 70 configured to control the second VCM $20_2$. In one embodiment, the master control circuit 68 and slave control circuit 70 may be implemented in separate integrated circuits that communicate with one another over a suitable interface, such as a serial interface. For example, in one embodiment the slave control circuit 70 transmits to the master control circuit 68 information concerning the status of the second VCM $20_2$, such as whether the second VCM $20_2$ is in a parked mode, tracking mode, or seeking mode. When the second VCM $20_2$ is in the seeking mode, the information transmitted to the slave control circuit 70 also includes the current (estimated or measured) flowing through the second VCM $20_2$. In one embodiment, the master control circuit 68 generates the spindle control signal based on a function of the combined current flowing through the first VCM $20_1$ and the second VCM $20_2$. For example, in the embodiments described above the current Ivcm in the linear functions may represent the combined VCM currents during at least fifty percent of a seek operation for the first VCM $20_1$.

Figure 5B:
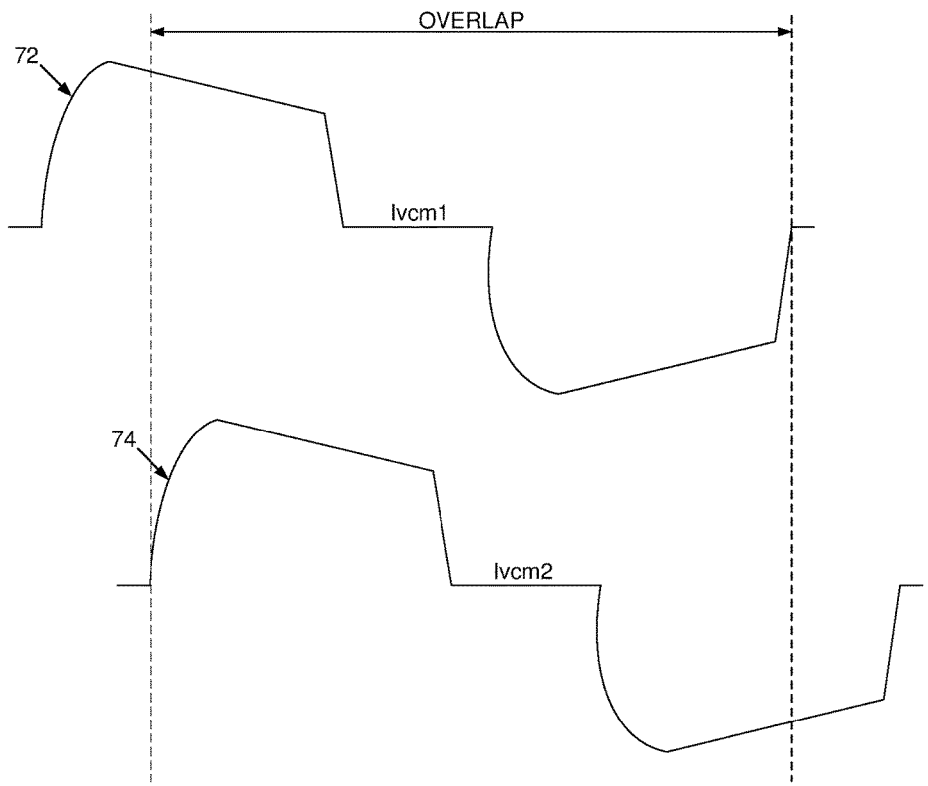
FIG. 5B shows an embodiment wherein the spindle control signal is generated based on the combined current flowing through the VCMs when there is overlap in the seek intervals.

In one embodiment, the master control circuit 68 in FIG. 5A may generate the spindle control signal as a function of the combined VCM currents during an interval when the seek operations of both VCMs overlap. However, when one VCM is seeking and the other VCM is tracking in order to access one of the disks, the spindle control signal is generated so as to maintain the rotation speed of the disks at the target access rotation speed (i.e., the spindle control signal is not adjusted as a function of either VCM current). An example of this embodiment is shown in FIG. 5B which shows a current seek profile 72 for the first VCM $20_1$, and a current seek profile 74 for the second VCM $20_2$, wherein the seek operations of each VCM at least partially overlap. At the beginning of the seek operation of the first VCM $20_1$ the second VCM $20_2$ is executing a tracking operation and so the spindle control signal is generated conventionally in order to maintain the access rotation speed for the disks. At some time during the first seek of the first VCM $20_1$, the second seek is initiated for the second VCM $20_2$ such that there is an overlap in the seek operations as shown in FIG. 5B. If during the concurrent seek of both VCMs the spindle control signal is not adjusted as described above, the second VCM would likely need a conservative seek profile to prevent the disk drive from exceeding the current limitations of the host supply voltage. That is, when concurrently seeking both VCMs the amount of current required by both VCMs is significantly greater as compared to seeking one of the VCMs. Accordingly in one embodiment in order to enable more aggressive seek profiles for both VCMs during a concurrent seek, the spindle control signal is generated based on a function of the combined VCM currents so that the spindle motor may source current to one or both VCMs during at least part of the concurrent seek.

Figure 5C:
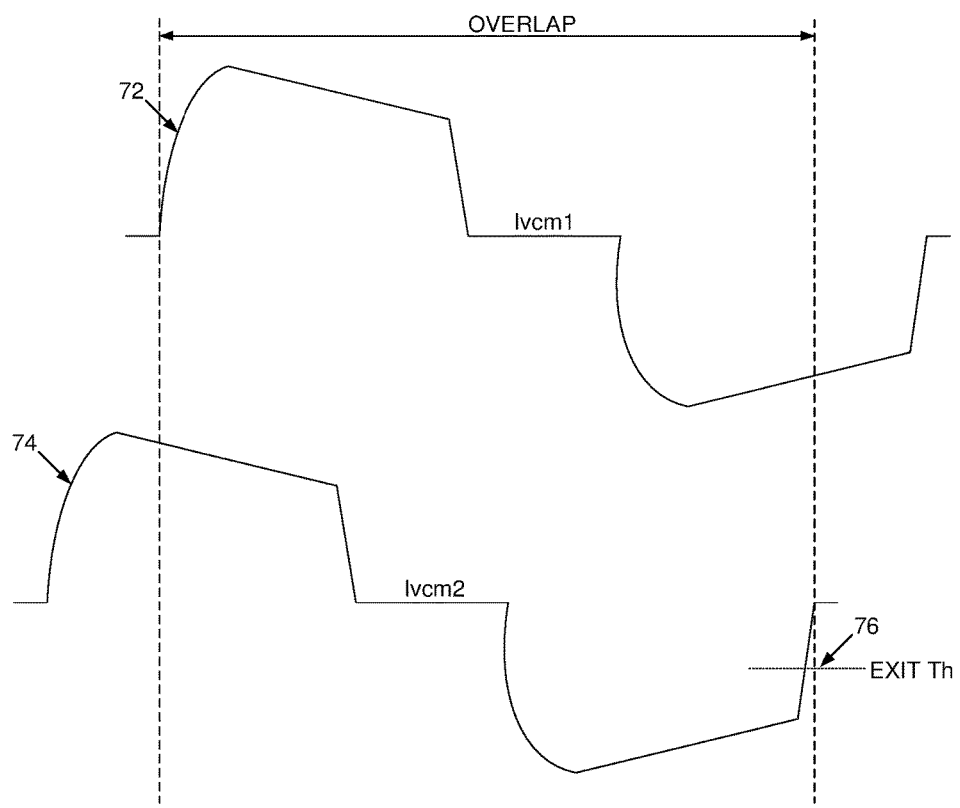
FIG. 5C shows an embodiment wherein a slave control circuit transmits an end of seek command to a master control circuit when the amplitude of the slave VCM current falls below an exit threshold during a deceleration phase of the seek.

FIG. 5C shows an embodiment wherein a seek operation of the second VCM $20_2$ is initiated prior to initiating a seek operation of the first VCM $20_1$. In this embodiment, when the amplitude of the second VCM current 74 falls below an exit threshold 76 during the deceleration phase of the seek, the master control circuit 68 exits the mode of adjusting the spindle control signal as a function of the VCM currents to ensure the rotation speed of the disks is regulated to the access rotation speed at the end of the second VCM $20_2$ seek operation. This embodiment compensates for the transport delay of the interface between the slave control circuit 70 and the master control circuit 68 which may otherwise cause a delay in regulating the spindle motor toward the access rotation speed at the end of the second VCM $20_2$ seek operation.

In one embodiment when either of the VCMs is in the parked mode (e.g., unloaded onto a ramp), the seeks of the un-parked VCM may be executed with aggressive seek profiles as enabled by the spindle control mode described above. That is when one of the VCMs is parked, adjusting the rotation speed of the spindle motor in order to source current from the spindle motor to a seeking VCM does not adversely affect the operation of the disk drive.

In one embodiment when a concurrent load operation of both VCMs is desired in order to concurrently load the heads of multiple VCMs over the disks (e.g., when the disk drive is powered on), the above described spindle control mode may be employed to cause the spindle motor to source current to the VCMs during the concurrent load operation. Loading both VCMs concurrently may expedite the load operation as compared to loading each VCM serially in order to avoid exceeding the current limitations of the host supply voltage.

Any suitable control circuitry may be employed to implement the flow diagrams in the above embodiments, such as any suitable integrated circuit or circuits. For example, the control circuitry may be implemented in a power integrated circuit, or in a component separate from the power integrated circuit, such as a disk controller, or certain operations described above may be performed by a power integrated circuit and others by a disk controller. In one embodiment, the power integrated circuit and disk controller are implemented as separate integrated circuits, and in an alternative embodiment they are fabricated into a single integrated circuit or system on a chip (SOC). In addition, the control circuitry may include a suitable preamp circuit and a read channel circuit implemented as separate integrated circuits, integrated into the or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive, an optical disk drive, a hybrid disk drive, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
    a disk;
    a spindle motor configured to rotate the disk;
    a first head;
    a first voice coil motor (VCM) configured to actuate the first head over the disk; and
    control circuitry configured to:
        first seek the first head over the disk;
        during at least fifty percent of the first seek, generate a spindle control signal based on a continuous function of a current flowing through the first VCM; and
        apply the spindle control signal to the spindle motor during the at least fifty percent of the first seek.

2. The data storage device as recited in claim 1, wherein the continuous function maintains a combined current of a current flowing through the spindle motor and the current flowing through the first VCM substantially constant during the at least fifty percent of the first seek.

3. The data storage device as recited in claim 1, wherein the continuous function comprises a linear function.

4. The data storage device as recited in claim 3, wherein when the spindle control signal applied to the spindle motor causes current to flow into the spindle motor, the linear function comprises:

$$\text{Max\_Spin} - K1 * Ivcm$$

where max_spin represents a maximum for the spindle control signal, Ivcm represents the current flowing through the first VCM, and K1 represents a predetermined gain.

5. The data storage device as recited in claim 4, wherein when the spindle control signal applied to the spindle motor causes the spindle motor to source current to the first VCM, the linear function comprises:

$$COD - K2 * (Ivcm - (\text{Max\_Spin} - COD)/K1)$$

where COD (change of direction) represents a threshold for the spindle control signal wherein the spindle motor begins sourcing current to the first VCM and K2 represents a predetermined gain.

6. The data storage device as recited in claim 5, wherein K1 is greater than K2.

7. The data storage device as recited in claim 1, wherein:
    during an acceleration phase of the first seek, the continuous function comprises a first function; and
    during a deceleration phase of the first seek, the continuous function comprises a second function different from the first function.

8. The data storage device as recited in claim 1, further comprising:
    a second head; and
    a second VCM configured to actuate the second head over the disk,
    wherein during the at least fifty percent of the first seek the control circuitry is further configured to:
    second seek the second head over the disk; and
    generate the spindle control signal based on a continuous function of a combined current flowing through the first VCM and the second VCM.

9. A method of operating a data storage device, the method comprising:
    rotating a disk using a spindle motor;
    actuating a first head over the disk using a first voice coil motor (VCM);
    first seeking the first head over the disk; and
    during at least fifty percent of the first seek, generating a spindle control signal based on a function of a current flowing through the first VCM; and
    applying the spindle control signal to the spindle motor during the at least fifty percent of the first seek, wherein the function maintains a combined current of a current flowing through the spindle motor and the current flowing through the first VCM substantially constant.

10. The method as recited in claim 9, wherein the function is a continuous function.

11. The method as recited in claim 10, wherein the continuous function comprises a linear function.

12. The method as recited in claim 11, wherein when the spindle control signal applied to the spindle motor causes current to flow into the spindle motor, the linear function comprises:

$$Max\_Spin-K1*Ivcm$$

where max_spin represents a maximum for the spindle control signal, Ivcm represents the current flowing through the first VCM, and K1 represents a predetermined gain.

13. The method as recited in claim 12, wherein when the spindle control signal applied to the spindle motor causes the spindle motor to source current to the first VCM, the linear function comprises:

$$COD-K2*(Ivcm-(Max\_Spin-COD)/K1)$$

where COD (change of direction) represents a threshold for the spindle control signal wherein the spindle motor begins sourcing current to the first VCM and K2 represents a predetermined gain.

14. The method as recited in claim 13, wherein K1 is greater than K2.

15. The method as recited in claim 9, wherein:
during an acceleration phase of the first seek, the function comprises a first function; and
during a deceleration phase of the first seek, the function comprises a second function different from the first function.

16. The method as recited in claim 9, wherein during the at least fifty percent of the first seek the method further comprises:
actuating a second head over the disk using a second VCM;
second seeking the second head over the disk; and
generating the spindle control signal based on a function of a combined current flowing through the first VCM and the second VCM.

17. Control circuitry configured to:
during at least fifty percent of a first seek, generate a spindle control signal based on a continuous function of a current flowing through a first voice coil motor (VCM) configured to actuate a first head over a disk; and
apply the spindle control signal to a spindle motor during the at least fifty percent of the first seek, wherein the spindle motor is configured to rotate the disk.

18. The control circuitry as recited in claim 17, wherein the continuous function maintains a combined current of a current flowing through the spindle motor and the current flowing through the first VCM substantially constant during the at least fifty percent of the first seek.

19. The control circuitry as recited in claim 17, wherein the continuous function comprises a linear function.

20. The control circuitry as recited in claim 19, wherein when the spindle control signal applied to the spindle motor causes current to flow into the spindle motor, the linear function comprises:

$$Max\_Spin-K1*Ivcm$$

where max_spin represents a maximum for the spindle control signal, Ivcm represents the current flowing through the first VCM, and K1 represents a predetermined gain.

21. The control circuitry as recited in claim 20, wherein when the spindle control signal applied to the spindle motor causes the spindle motor to source current to the first VCM, the linear function comprises:

$$COD-K2*(Ivcm-(Max\_Spin-COD)/K1)$$

where COD (change of direction) represents a threshold for the spindle control signal wherein the spindle motor begins sourcing current to the first VCM and K2 represents a predetermined gain.

22. The control circuitry as recited in claim 21, wherein K1 is greater than K2.

23. The control circuitry as recited in claim 17, wherein:
during an acceleration phase of the first seek, the continuous function comprises a first function; and
during a deceleration phase of the first seek, the continuous function comprises a second function different from the first function.

24. The control circuitry as recited in claim 17, wherein during the at least fifty percent of the first seek the control circuitry is further configured to generate the spindle control signal based on a continuous function of a combined current flowing through the first VCM and a second VCM while concurrently seeking the first VCM and the second VCM.

* * * * *